(12) United States Patent
Mikkelsen

(10) Patent No.: US 9,468,856 B2
(45) Date of Patent: Oct. 18, 2016

(54) COMPUTER IMPLEMENTED METHOD FOR CALCULATING A GAME SCORE TO CREATE A RANKING

(75) Inventor: Jacob Mikkelsen, Copenhagen V (DK)

(73) Assignee: IO INTERACTIVE A/S, Copenhagen V (DK)

( * ) Notice: Subject to any disclaimer, the term of this patent is extended or adjusted under 35 U.S.C. 154(b) by 0 days.

(21) Appl. No.: 13/421,265

(22) Filed: Mar. 15, 2012

(65) Prior Publication Data

US 2012/0252583 A1   Oct. 4, 2012

(30) Foreign Application Priority Data

Mar. 31, 2011   (JP) ................................. 2011-079527

(51) Int. Cl.
| | | |
|---|---|---|
| *A63F 13/10* | (2006.01) | |
| *A63F 13/798* | (2014.01) | |
| *A63F 13/63* | (2014.01) | |
| *A63F 13/46* | (2014.01) | |

(52) U.S. Cl.
CPC ............ *A63F 13/798* (2014.09); *A63F 13/46* (2014.09); *A63F 13/63* (2014.09); *A63F 2300/407* (2013.01); *A63F 2300/558* (2013.01); *A63F 2300/6018* (2013.01); *A63F 2300/61* (2013.01)

(58) Field of Classification Search
USPC ..................................................... 463/42–43
See application file for complete search history.

(56) References Cited

U.S. PATENT DOCUMENTS

| | | | |
|---|---|---|---|
| 8,814,664 B2* | 8/2014 | Amaitis .................... A63F 9/24 463/1 |
| 2002/0119824 A1* | 8/2002 | Allen ............................. 463/42 |
| 2003/0093168 A1 | 5/2003 | Nagaoka |
| 2004/0002384 A1* | 1/2004 | Multerer et al. ............... 463/42 |
| 2004/0224741 A1* | 11/2004 | Jen ......................... A63F 13/10 463/6 |
| 2006/0287096 A1* | 12/2006 | O'Kelley et al. ............... 463/42 |
| 2007/0191102 A1* | 8/2007 | Coliz et al. .................... 463/42 |
| 2007/0191105 A1 | 8/2007 | Azuma |
| 2009/0239668 A1* | 9/2009 | Han ................................ 463/42 |
| 2011/0281638 A1* | 11/2011 | Bansi et al. ................... 463/23 |
| 2012/0015748 A1* | 1/2012 | Osada ............................ 463/43 |
| 2013/0288788 A1* | 10/2013 | Lim ........................ A63F 13/12 463/31 |
| 2013/0331158 A1* | 12/2013 | Kurtz ..................... A63F 13/12 463/6 |

FOREIGN PATENT DOCUMENTS

| | | |
|---|---|---|
| JP | 2007-190203 | 8/2007 |
| JP | 2009-233104 | 10/2009 |

OTHER PUBLICATIONS

Search report from E.P.O., mail date is May 19, 2015.

* cited by examiner

*Primary Examiner* — Tramar Harper
(74) *Attorney, Agent, or Firm* — Greenblum & Bernstein, P.L.C.

(57) ABSTRACT

A game system or a method is provided that can create game scenarios based on requests from players. The server may include a player database, a receiver, an analyzer, a scenario creator, a calculator, an update tool and a ranking creator. The server may further include a scenario data base for storing scenarios. The processing unit, a main program stored at the main memory, and the processing units of the server may act as each of the element.

15 Claims, 8 Drawing Sheets

COMPUTER IMPLEMENTED METHOD FOR CALCULATING A GAME SCORE TO CREATE A RANKING

TECHNICAL FIELD

The present invention relates to a method for calculating a game score (Japanese Patent Publication No. 2007-190203). In particular, the present invention relates to a method for creating new game scenarios used in the game based on the requests from players and calculating a game score to create a ranking of the game.

BACKGROUND OF THE INVENTION

There are several on-line game systems that can create and show a ranking of players. In such systems, the server of the system provides scenarios to client computers. Each of the players plays the game scenarios and the game server accumulates total game score of the player.

CITATION LIST

Patent Literature

Patent Literature 1: Japanese Patent Publication No. 2007-190203

SUMMARY OF INVENTION

Technical Problem

The conventional game system has a drawback that the game scenarios are almost fixed because they have already created and players cannot create game scenarios. For example, one game player whose game character is a specialist for gun shooting may wish to compare the skill of gun shooting in the game with a special condition. However, it is difficult to satisfy his request because the game scenarios of the on-line game are almost fixed and lack flexibility.

Solution to Problem

To solve the above drawbacks, the present invention creates game scenarios based on requests from players. Furthermore, several players can emulate in the special scenario. Thus it is possible for the present invention to attract players.

The first aspect of the invention relates to a computer implemented method. The method is especially for a game. The method calculates a game score to create a ranking in a game. When one player wishes to create a new game scenario, he inputs information on the scenario into his computer. A scenario is also called as a Quest or a Contract in roll playing games. The input information comprises condition of the scenario. The condition may comprise one or more missions of the scenario. The condition may comprise information on one or more weapons that may be used in the scenario. The computer may be a mobile, a game apparatus or a personal computer. The computer, a first client computer, sends the information to the server.

The receiver of the server receives the request to create the first scenario in the game and the one or more conditions regarding the first scenario. The server stores a game program to produce a new scenario based on the game conditions. The analyzer of the server analyzes the conditions. The scenario creator creates the first scenario using the one or more conditions. The server may store the created scenario in its database.

After the server creates the first scenario, it may upload the scenario so that players of the game can play the scenario. When the server uploads the scenario, the server may also upload information on the scenario. Examples of the information are the player who sends the information to create the scenario, the difficulty level of the scenario, the location or stage of the scenario, the weapon of the scenario, typical condition of the scenario and the mission of the scenario.

When the player of the client computers 3a, 3b, 3c, 3d, 3e decide to play the scenario, he inputs a request to his client computer. Then the computer sends the request to play the scenario to the server. The server provides the program to play the scenario and the client computer can download the program. Then the player can play the scenario. After the player of the client computer plays the scenario, the client computer provides the game play data with the server. The game play data may include information of the player, result of the scenario and play time for the scenario.

The game score may be calculated by the client computer or the server. When the server calculates the game score, the receiver of the server may receive the game play data. The calculator of the server calculates the game score of the scenario using the game play data. The memory of the server may store tables to calculate the game score and the game program make a controlling unit of the server to calculate the game score using the tables based on the game play data. An update tool of the server then overwrites the total game score of the player, which is stored in the player database of the server. The tool may add the currently calculated game score of the scenario to previous total game score of the player. The total scores of players are stored in the memory of the server. The ranking creator of the server may create or renew the ranking of the game using the updated total score of the player.

When the client computer calculates the game score, the receiver of the client computer may receive the game play data. The calculator of the client computer calculates the game score and sends it to the server.

The second aspect of the invention relates to a game system for calculating a game score to create a ranking in a game. The game system comprises a server and one or a plurality of clients that are connected with the server. The server may be one or a plurality of computers. The game server comprises a player database, a receiver, an analyzer, a scenario creator, a calculator, an update tool and a ranking creator. The client computer may comprise the calculator. The server may comprise further tools or elements to execute the game as a conventional game server comprises.

The player database stores player information. The information includes identifications of players and total game score of each player. The receiver receives a request to create a first scenario in the game and one or more conditions regarding the first scenario from a first client computer. The analyzer analyzes the one or more conditions. The scenario creator creates the first scenario using the one or more conditions. The receiver further receives game play data of the first scenario from a second client computer after a player of the second client computer plays the first scenario. The game play data includes information of the player, result of the first scenario and play time for the first scenario. The calculator calculates a game score of the first scenario using the game play data. The update tool updates total game score of the player by adding the game score of the first scenario.

The ranking creator creates a ranking of players in the game considering the updated total game score of the player.

Advantageous Effects of Invention

The present invention can create game scenarios based on requests from players. Then, several players can emulate in the special scenario. Thus it is possible for the present invention to attract players.

DESCRIPTION OF EMBODIMENTS

Figure 1:
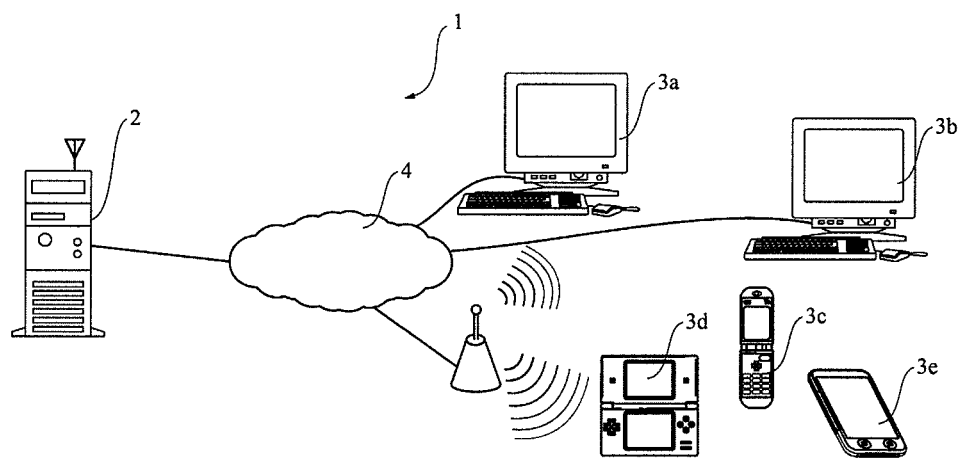
FIG. 1 depicts the example of the system of the present invention.

FIG. 1 depicts the example of the system of the present invention. As shown in the FIG. 1, the game system 1 of the present invention comprise a server 2 and one or a plurality of client computers 3a, 3b, 3c, 3d, 3e that are connected through a network 4. The server 1 may be a standalone computer or a plurality of computers. The client may be a tool or an apparatus that can play game. The client computers 3a, 3b, 3c, 3d, 3e may be a personal computer, a game apparatus, a mobile phone, or a mobile game apparatus. Each computer may store a game program in its main memory so that the user or player can play the game. The server 2 may provide whole or a part of the game program with the client computer. The examples of the network are an internet and a wireless network.

Figure 2:
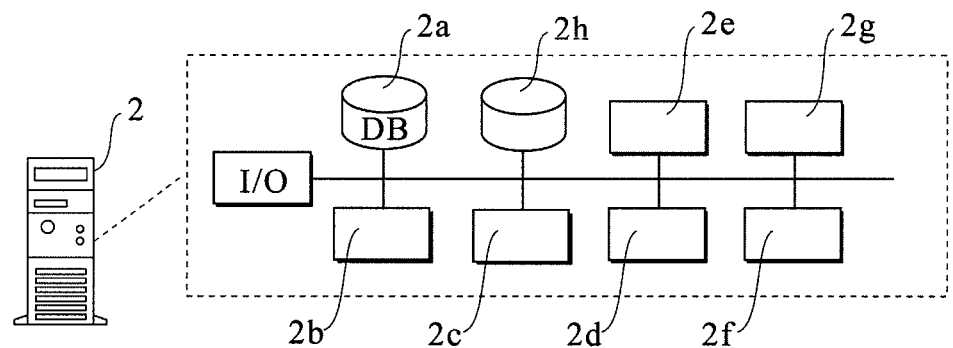
FIG. 2 depicts the example of the block diagram of the server of the present invention.

FIG. 2 depicts the example of the block diagram of the server of the present invention. FIG. 2 is an explanation of the feature of the server. Thus each element of the block diagram explains the function of the server and may be implemented by hardware and software. As shown in the FIG. 2, the server may comprise a player database 2a, a receiver 2b, an analyzer 2c, a scenario creator 2d, a calculator 2e, an update tool 2f and a ranking creator 2g. As shown in the figure, the server may further comprise a scenario database 2h for storing scenarios. The processing unit, a main program stored at the main memory, and the processing units of the server 2 may act as each of the element. The server 2 may comprise further tools or elements to execute the game as a conventional game server comprises. The client computers may have the receiver 2b and the calculator 2e.

Figure 3:
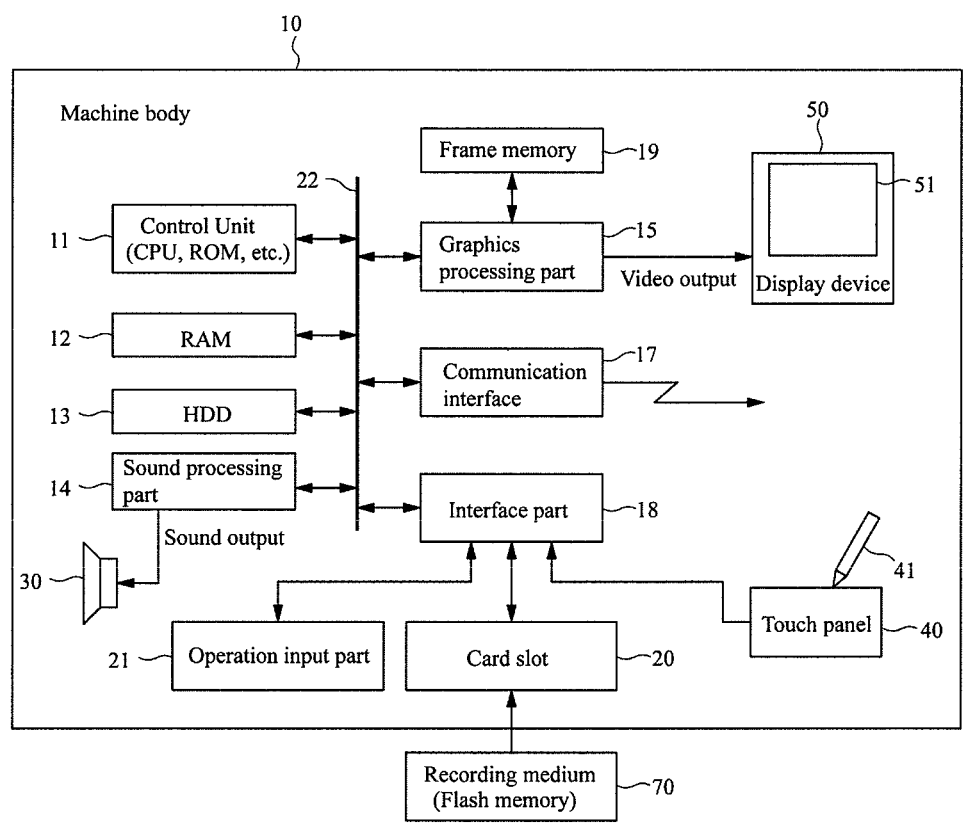
FIG. 3 is a block diagram for illustrating a configuration example of a computer.

FIG. 3 is a block diagram for illustrating a configuration example of a computer. The computer 10 may act as the server 2. The client computers 3a, 3b, 3c, 3d, 3e may comprise the configuration shown in the FIG. 3. The operation input part 21 is composed of power switches such as a power switch and keys such as a cross key.

The circuit placed within the machine body 10 comprises a control unit 11, a RAM 12, a hard disc drive (HDD) 13, a sound processing part 14, a graphics processing part 15, a communication interface 17, an interface part 18, a frame memory 19, and a card slot 20. The control unit 11, the RAM 12, the hard disc drive (HDD) 13, the sound processing part 14, the graphics processing part 15, the communication interface 17, and the interface part 18 are each connected to an internal bus 22.

The control unit 11, comprising a CPU, a ROM, etc., controls the entire game machine 100 in accordance with the control program stored in the HDD 13 or a recording medium 70. The control unit 11 is provided with an internal timer which is used, for example, to generate timer interrupts. The RAM 12 is also used as a working area for the control unit 11.

The sound processing part 14, provided with a sound input/output interface function for performing D/A and A/D conversion of sound signals, is connected to a sound output device 30 composed, for example, of a speaker. The sound processing part 14 outputs sound signals to the sound output device 30 in accordance with the sound output instructions from the control unit 11 executing processes in accordance with various control programs.

The graphics processing part 15 is connected to the display device 50 has the first image display part 51. The graphics processing part 15 distributes images to the frame memory 19 in accordance with the drawing instructions from the control unit 11 and also outputs video signals for displaying the images on the image display part 51 to the display device 50. The switching time for the images displayed according to the video signals is set to 1/30 seconds per frame, for example.

The recording medium 70 stored with programs etc. is inserted into the card slot 20. The recording medium 70 in the present embodiment is a semiconductor memory such as a writable flash memory. The communication interface 17 is connectable to another game machine wired or wirelessly, and also is connectable to a communication network such as the Internet. The machine body 10 can communicate with another game machine using the communication function of the communication interface 17.

The operation input part 21, the card slot 20 and the touch panel 40. are connected to the interface part 18. The interface part 18 stores, on the RAM 12, the instruction data from the operation input part 21 based on the player's (player's) operation and the instruction data based on the player's operation of the touch panel 40 using a touch pen 41 etc. Then, the control unit 11 executes an arithmetic processing in accordance with the instruction data stored in the RAM 12.

The touch panel 40 is stacked on the side of the display screen(s) of both or either of the image display part 51. Therefore, the control unit 11 recognizes input information depending on the operation inputs by a player, by managing/controlling the timing of display at the side of both or either of the image display part 51 where the touch panel 40 is stacked, the timing of operation of the touch panel 40 using the touch pen 41 etc. and the position coordinate. The display device 50 may configure the display screen with one image display part instead of having a plurality of image display parts such as the image display part 51.

The interface part 18 executes the processes, in accordance with the instructions from the control unit 11, such as storing the data showing the progress of the game stored in the RAM 12 in the recording medium 70 which is inserted into the card slot 20, or reading out the game data at the time of interruption stored in the recording medium 70 and transferring the data to the RAM 12.

Various data such as a control program for playing a game on the game machine is stored in the recording medium 70. The various data such as a control program stored in the recording medium 70 is read out by the control unit 11 through the card slot 20 where the recording medium 70 is inserted and is loaded into the RAM 12.

The control unit 11 executes various processes, in accordance with the control program loaded into the RAM 12, such as outputting drawing instructions to the graphics processing part 15, or outputting sound output instructions to the sound processing part 14. While the control unit 11 is executing the processing, the data occurring intermediately depending on the game progress is stored in the RAM 12 used as a working memory.

Figure 4:
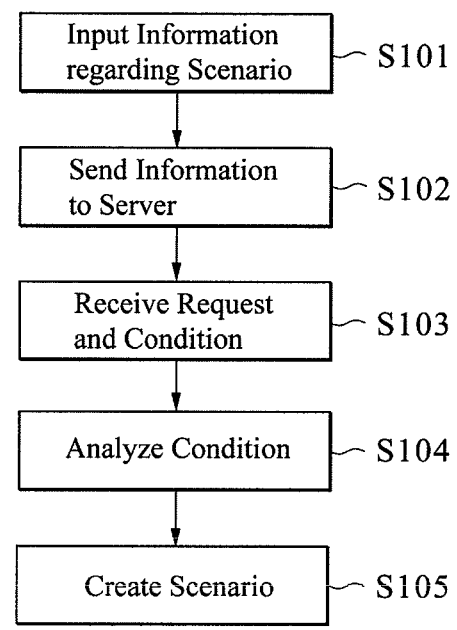
FIG. 4 is an example of the flow chart to create a new scenario.

FIG. 4 is an example of the flow chart to create a new scenario. When one player wishes to create a new game scenario, he inputs information regarding the scenario into his computer (S101). The input information comprises condition of the scenario. The condition may comprise one or more missions of the scenario. The example of the mission is to beat boss A. Another example of the mission is to go to point A and steal treasure A. The candidates of the mission may be shown at the display of the client and the player may select the displayed mission. The condition may comprise information on one or more weapons that may be used in the scenario.

The computer 3a sends the information to the server 2 (S102). The information may include a request to create a new scenario and the conditions of the scenario. The information may be sent through the network 4.

The receiver 2b of the server 2 receives the request to create the first scenario in the game and the one or more conditions regarding the first scenario (S103). The server stores a game program to produce the new scenario based on the game conditions. The server 2 may store the received conditions into its memory.

The analyzer 2c of the server 2 analyzes the conditions (S104). In analyzing the conditions, the server may read the conditions from its memory. The scenario creator 2d creates the first scenario using the one or more conditions. For example the conditions comprise a difficulty level and information of the boss then the server creates a new scenario based on the difficulty level and the information of the boss.

After the server 2 creates the first scenario, it may upload the scenario so that players of the game can play the scenario (S105). When the server uploads the scenario, the server may also upload information on the scenario. Examples of the information are the player who sends the information to create the scenario, the difficulty level of the scenario, the location or stage of the scenario, the weapon of the scenario, typical condition of the scenario and the mission of the scenario. After the server 2 upload the new scenario, the client computers can access the new scenario. The server 2 may store the created scenario in the scenario database.

Figure 5:
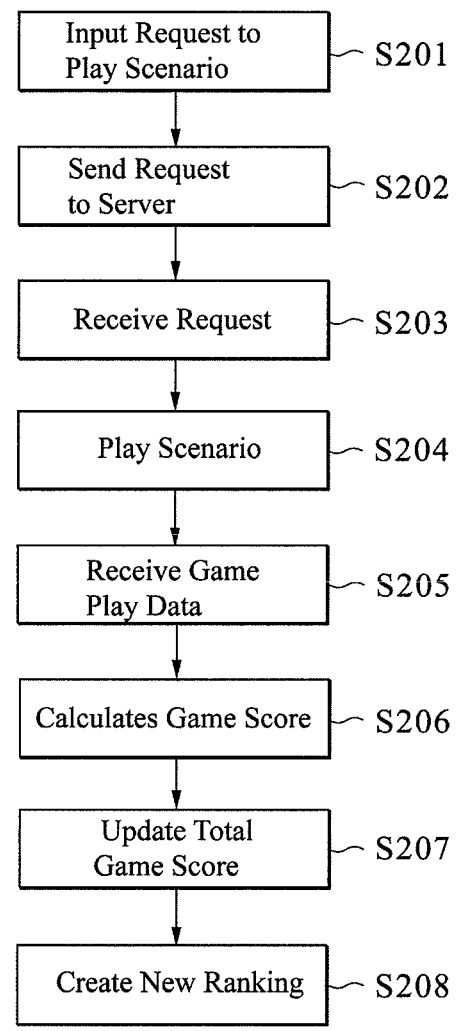
FIG. 5 is an example of the flow chart to create a revised ranking.

FIG. 5 is an example of the flow chart to create a revised ranking. When the player of the client computers 3a, 3b, 3c, 3d, 3e decide to play the scenario, he inputs a request to his client computer (S201). When the computer is a machine at a game place or a theme park, to insert a coin may be the request.

Then the computer 3b sends the request to play the scenario to the server 2 (S202). The server 2 provides the program to play the scenario and the client computer can download the program (S203). Before the server 2 provides the scenario with the computer 3b, the server 2 may read the scenario program from the memory and then the server 2 sends the program through the network 4.

Then the client computer 3b may store the program to play the new scenario in its memory. Then the player of the client computer 3b can browse the scenario. The player plays the new scenario (S204). After the player of the client computer 3b plays the scenario, the client computer 3b provides the game play data with the server 2. The game play data may include information of the player, result of the scenario and play time for the scenario. In case the client computer computes the game score, the client does not have to send the game data to the server.

The receiver 2a of the server 2 receives the game play data (S205). Then the game play data is input into the server 2. Repeatedly, if the client computer calculates the game score, the receiver of the client computer may receive the game data and calculate the game score and send it to the server.

The calculator 2e of the server 2 calculates the game score of the scenario using the game play data (S206). The memory of the server may store tables to calculate the game score and the game program make a controlling unit of the server to calculate the game score using the tables based on the game play data. If the result of the scenario is fail, then the score may be a minus value. When the client computer computes the game score, the computer may comprise the calculator and may calculate the game score.

An update tool 2f of the server 2 then overwrites the total game score of the player, which is stored in the player database 2a of the server 2 (S207). The server may read the previous total game score of the user from the player database 2a using information of the player. Then the tool 2f may add the currently calculated game score to previous total game score of the player.

The ranking creator 2g of the server 2 may create or renew the ranking of the game using the updated total score of the player (S208). When the player plays the game or the scenario first, the ranking of the game may be created. Other players have played the game or the scenario then the server may renew the ranking. Because the scores of the players are stored in the player database, the ranking creator 2g can compute the new ranking using the total scores of other players and currently computed total score of the player. The renewed ranking may be uploaded and the players may watch the renewed ranking by means of the client computers.

The server may receive the result when the other player plays the scenario. Then the server may renew the condition of the scenario. For example, the scenario may comprise information of the cleared times of the scenario. The server may compare the best cleared time and the clear time of the player. And the server may decide the scenario is completed when the clear time of the player is faster than the best cleared time. Further, two or more players can emulate the same scenario. In such a case, the player who gets higher or the highest score may be a winner.

Example 1

Figure 6:
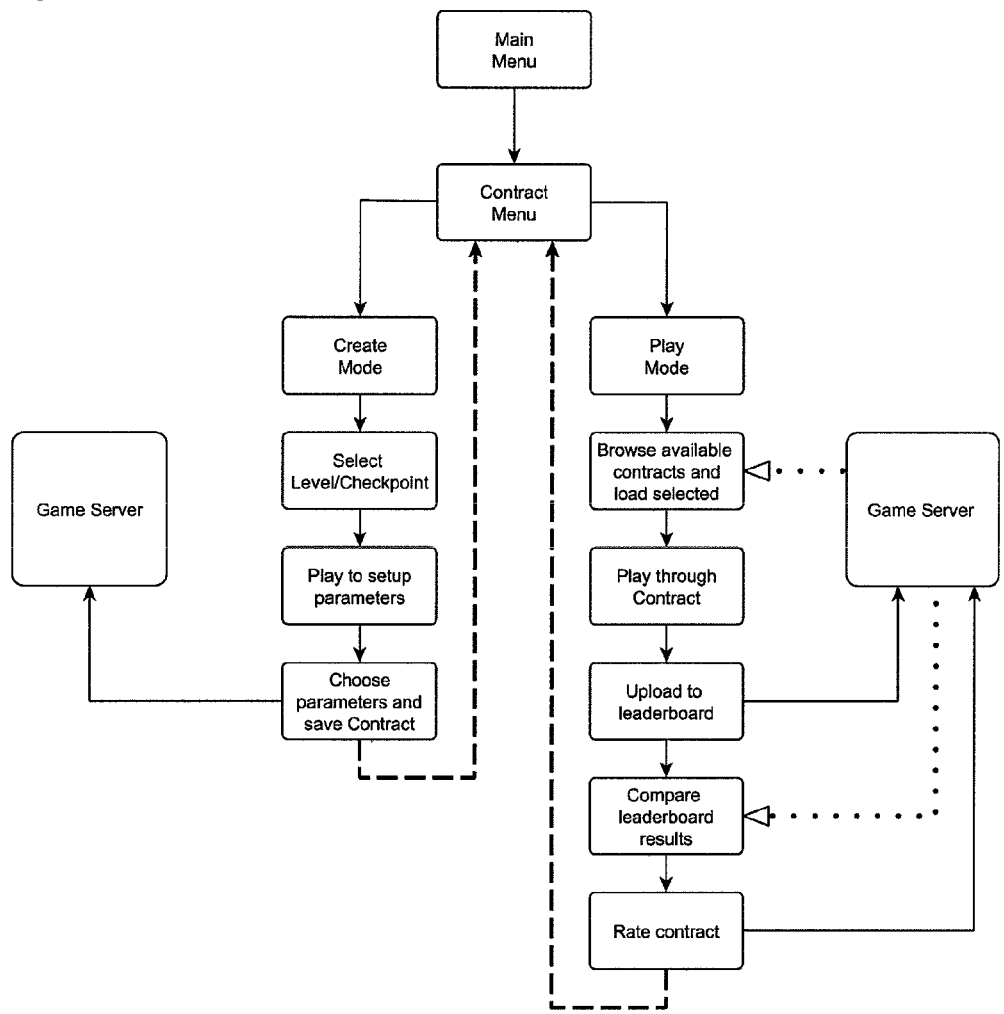
FIG. 6 depicts a flow chart of the game of the Example 1.

FIG. 6 depicts a flow chart of the game of the Example 1. In the Example, Contract means an example of Scenario. When a player plays the game, like Hitman (registered trademark), the main menu of the game is shown at the monitor of the client computer.

The main menu comprises a link to Contract Menu to create a new scenario and play one scenario. Namely, at the Contract Menu the link to Create Contract and the link to Play Contract may be shown at the monitor. Then the player can chose which mode he plays. When he decides to create a new scenario, he may select Create Mode.

In this example, Level information and Checkpoint information are displayed at the monitor. Level information may comprise information of stage or information of difficulty. Checkpoint information may comprise Checkpoints where the player has passed through. In this case, the player database may store the information of the Checkpoints the player has passed through. Further the player database may store the stage information that the player has arrived at. The server may read the stage information stored at the database and may display only the information of the stages that the player has arrived at. Then the player inputs one or both of Level and Checkpoint. The server receives the information of Level and Checkpoint and stores the information. The client computer may store the information.

Next, the mode to input setup parameters is displayed at the monitor. The example of the parameter is a weapon which can be used in the Contract. The server may prepare candidates of such setup parameters and make the client computer display the candidate.

Then, the player chooses parameters that are shown at the display of the client computer. The computer provides the setup parameters with the server. The computer may read the Level and Checkpoint from its memory and may send them together with the setup parameters to the server.

The server receives necessary information to create the Contract. Because the memory of the server stores the program to create a Contract using the information to create a Contract, the server can create the Contract. The server may store conditions to calculate the game score.

When the player selects Play mode, the client computer browses available Contract. The computer may browse load of the Contract. The server may prepare necessary information for the client computer to browse the available Contract and the load.

Then the player chooses one Contract to play. The information of the Contract may be sent to the server. Then the client computer can download the data to play the Contract from the server. The player then plays the Contract. Then the client computer or the server computes game score for the Contract. To compute game score, the conditions to calculate the game score, a leader board, may be used to compute game score using the game play data.

Then the client computer sends information of the player and the game score to the server.

Example 2

Figure 7:
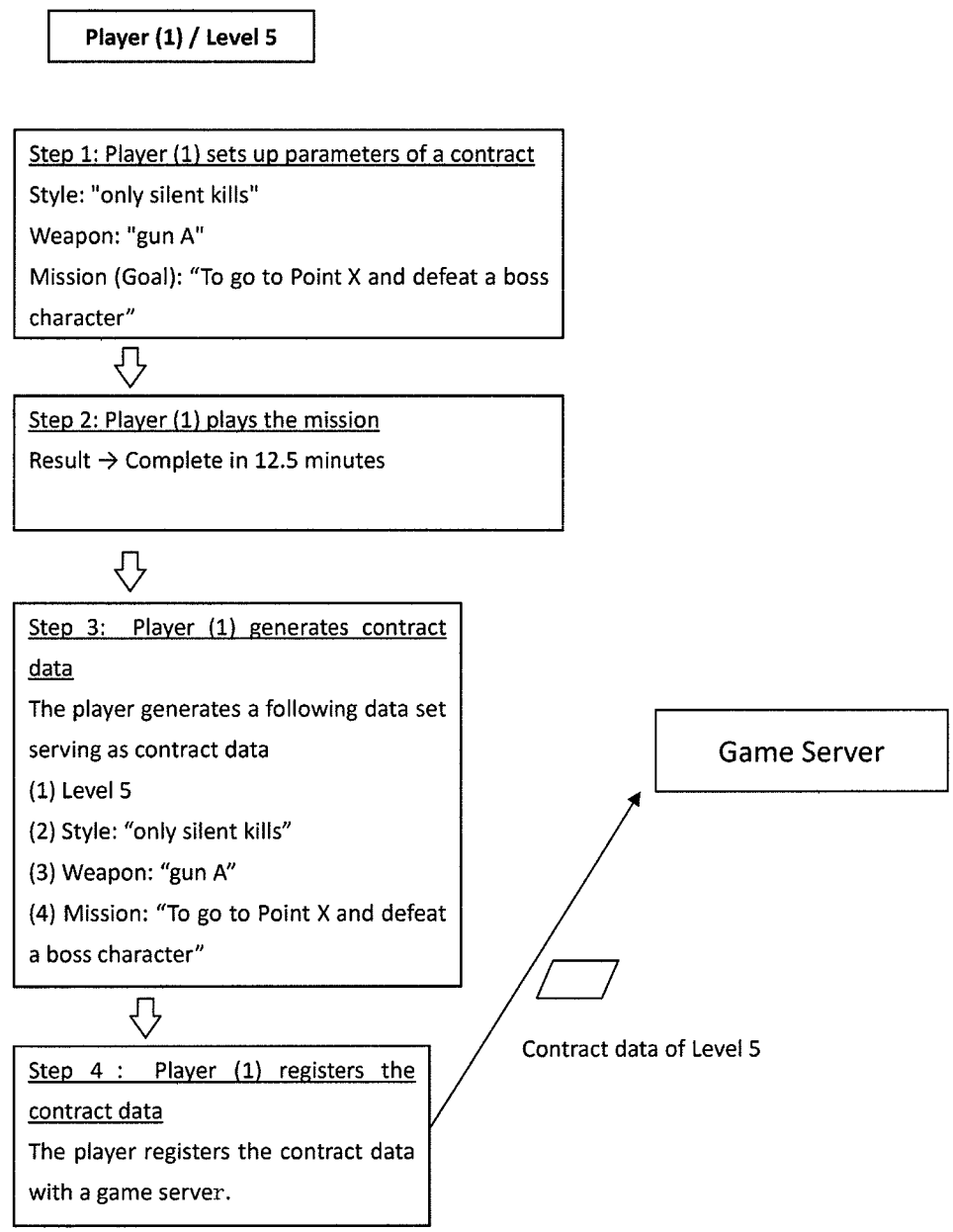
FIG. 7 depicts the Schematic View of the Contract System.

FIG. 7 depicts the Schematic View of the Contract System. In this example, the player (1) at level 5 creates a new Contract. The player (1) sets up parameters of the Contract. In this example, the conditions include style, weapon, and a mission. The style is decided to be "only silent kills". The weapon is selected to be a gun A. The mission is decided to go to point X and defeat a boss character. The client computer or the server, which has received the information to create the new Contract, creates the new Contract.

In this example, the player plays the Contract. The result of completion of the mission is 12.5 minutes. The result of the Contract may be sent to the server when the server computes the game score.

The computer may generate Contract data. Then the client computer may register the contract data with the server. In this case the contract data includes the information of the time to complete the mission.

Then the server can make a client computer to browse the Contract with level of each Contract. Each server can access the game server to select the Contract data that matches with the player's own level.

Figure 8:
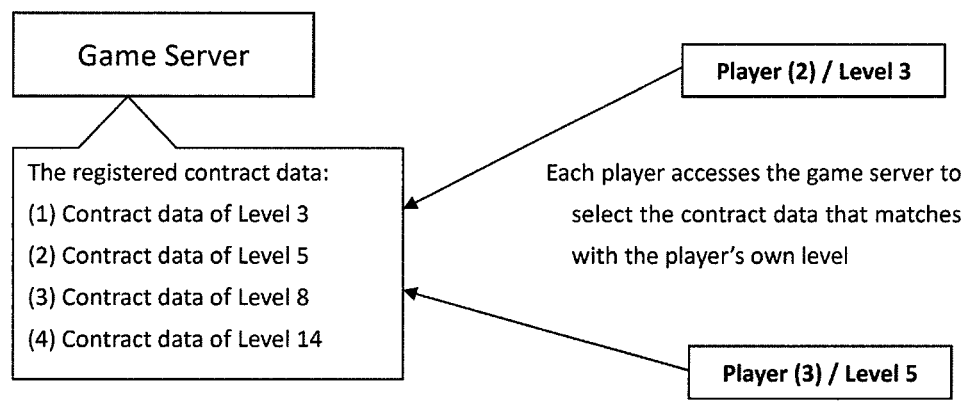
FIG. 8 depicts the schematic view of the Game Server.

FIG. 8 depicts the schematic view of the Game Server. The server contains the database that stores the registered Contract data. The data may be categorized by the level of the Contracts. The client of the player can show the categories so that the player can select the Contract data that matches with the player's own level. When the player selects the Contract, the information is sent to the server. Then the player can download the selected Contract to play game based on the downloaded game.

Figure 9:
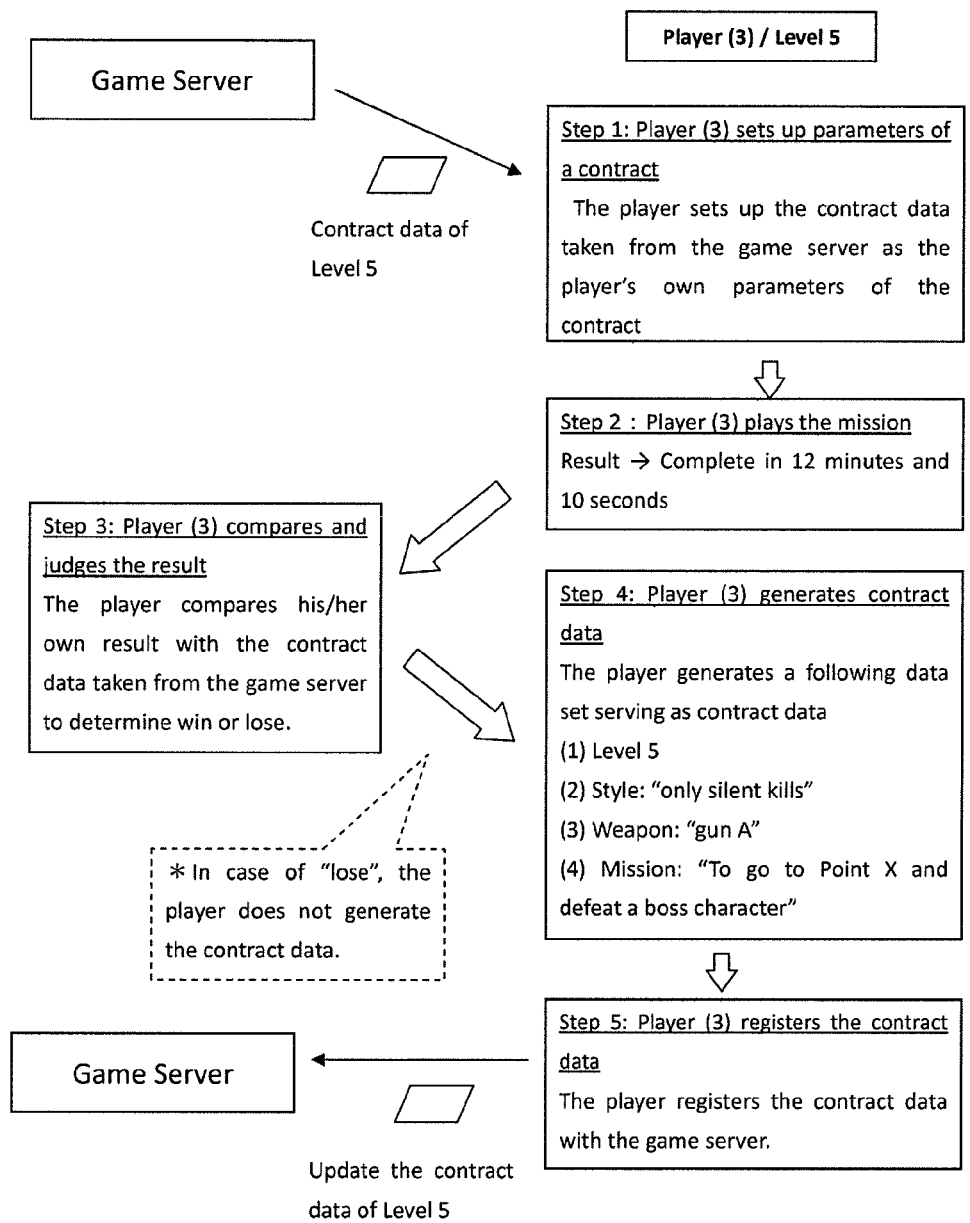
FIG. 9 depicts the schematic view of Contract System.

FIG. 9 depicts the schematic view of Contract System. In this example, the player is the player (3) and at level 5. The game server provides Contract data of level 5. The payer (3) sets up parameters of a Contract within the Contract sent from the server. The player sets up the Contract data taken from the game server as the player's own parameters of the Contract.

Then the player (3) plays the Contract and attains the mission of the Contract. The result is that to complete the mission requires 12 minutes and 10 seconds.

The client computer of the player (3) or the server compares the result with the Contract data taken from the game server to determine win or lose.

Then the client computer or the server may generate new data set that serves as Contract data.

The client computer or the server may register the Contract data with the game server. Then the Contract data is uploaded.

INDUSTRIAL APPLICABILITY

The method and the system of the present invention are useful in the amusement industry.

The invention claimed is:
1. A computer implemented method for calculating a game score to create a ranking in a game executed by a processor of a computer, the method comprising:
  receiving, at a receiver from a first client computer operated by a player, a request to create a first scenario in the game and one or more conditions of the game regarding the first scenario specified by the player operating the first client computer;
  analyzing, by at least one processor, the one or more conditions;
  receiving, at the receiver, game play data of the first scenario from the first client computer after the player of the first client computer plays the first scenario;
  determining whether the player of the first client computer achieved the one or more conditions of the first scenario;
  creating, by the at least one processor, the first scenario using the one or more conditions of the game specified by the player of the first client computer when the player of the first client computer has achieved the one or more conditions of the first scenario, the one or more conditions specified by the player of the first client computer being a specific metric to be achieved in the game;
  uploading the first scenario to a server for other unspecified players to access;

displaying the first scenario on a display of a second client computer operated by a player of the other unspecified players for selection;

receiving, at the receiver, a selection of the first scenario from the player operating the second client computer, game play data of the first scenario from the second client computer after the player of the second client computer plays the first scenario and updating the first scenario with the game play data received from the second client computer, wherein the game play data includes information of the player, result of the first scenario and play time for the first scenario;

calculating, by the at least one processor, a game score of the first scenario using the game play data;

updating, by the at least one processor, total game score of the player by adding the game score of the first scenario; and creating, by the at least one processor, a ranking of players in the game considering the updated total game score of the player, wherein the at least one processor creates a second scenario, different from the first scenario, and played within the same game as the first scenario, based on one or more conditions of the second scenario of the game specified by the player of the second client computer, in which the conditions include at least a mission within the second scenario to complete an assigned task in an assigned amount of time and at a designated level of difficulty, the second scenario is created by adding an additional condition to the one or more conditions of the first scenario or modifying the one or more conditions of the first scenario, the second scenario is uploaded to the server for other unspecified players to access, the first scenario and the second scenario are displayed on a display of a third client computer of a player of the other unspecified players for selection, and the at least one processor receives, from the third client computer, a selection of one of the first and second scenarios for game play.

2. The computer implemented method in accordance with claim 1, wherein the one or more conditions further comprise at least one of style and weapon, and one or more missions of the first scenario.

3. The computer implemented method in accordance with claim 2, wherein the one or more conditions further comprise information on one or more weapons that may be used in the first scenario.

4. The computer implemented method in accordance with claim 3, wherein the one or more conditions further comprise at least one of style and weapon, and a difficulty level of the first scenario or a stage of the first scenario, and wherein the method further comprises browsing the first scenario with the difficulty level or the stage of the first scenario.

5. The computer implemented method in accordance with claim 4, further comprising updating the first scenario when a second player plays the first scenario.

6. The computer implemented method in accordance with claim 3, further comprising updating the first scenario when a second player plays the first scenario.

7. The computer implemented method in accordance with claim 2, wherein the one or more conditions further comprise a difficulty level of the first scenario or a stage of the first scenario, and wherein the method further comprises browsing the first scenario with the difficulty level or the stage of the first scenario.

8. The computer implemented method in accordance with claim 7, further comprising updating the first scenario when a second player plays the first scenario.

9. The computer implemented method according to claim 1, wherein the first client computer plays the first scenario, and wherein the first scenario played by the first client computer, and the first scenario played by the second client computer are the same.

10. The computer implemented method in accordance with claim 1, wherein, when the player of the second client computer meets or exceeds the one or more conditions of the game specified by the player of the first client computer, the second client computer is authorized to add the additional condition to the one or more conditions corresponding to the first scenario.

11. The computer implemented method in accordance with claim 1, wherein, when the player of the second client computer meets or exceeds the one or more conditions of the game specified by the player of the first client computer, the second client computer is authorized to update the first scenario by modifying the one or more conditions of the game specified by the first client computer.

12. A game system for calculating a game score to create a ranking in a game executed by a processor in the game system, the game system comprising a server and one or a plurality of client computers that are connected with the server, wherein the server comprises:

a player database which stores player information including identifications of players, and total game score of each players;

a receiver for receiving, from a first client computer operated by a player, a request to create a first scenario in the game and one or more conditions of the game regarding the first scenario specified by the player operating the first client computer, and for receiving game play data of the first scenario from the first client computer after the player of the first client computer plays the first scenario;

an analyzer for analyzing the one or more conditions, and for determining whether he player of the first client computer achieved the one or more conditions of the first scenario; and a scenario creator for creating the first scenario using the one or more conditions of the game specified by the player of the first client computer when the player of the first client computer has achieved the one or more conditions of the first scenario, the one or more conditions specified by the first client computer being a specific metric to be achieved in the game, and for uploading the first scenario to a server for other unspecified players to access;

wherein the first scenario is displayed on a display of a second client computer operated by a player of the other unspecified players for selection, the receiver further receives, from the player operating the second client computer, a selection of the first scenario, game play data of the first scenario from the second client computer after a player of the second client computer plays the first scenario and updates the first scenario with the game play data received from the second client computer, wherein the game play data includes information of the player, result of the first scenario and play time for the first scenario;

the client computers or the server comprises:

a calculator for calculating a game score of the first scenario using the game play data; and an update tool for updating total game score of the player by adding the game score of the first scenario; and the server comprises a ranking creator for creating a ranking of players in the game considering the updated total game score of the player, wherein the scenario creator creates a second scenario, different from the first scenario, and played within the same game as the first scenario, based on one or more conditions of the second scenario of the game specified by the player of the second client computer, in which the conditions include at least a mission within the second scenario to complete an assigned task in an assigned amount of time and at a designated level of difficulty, the second scenario is created by adding an additional condition to the one or more conditions of the first scenario or modifying the one or more conditions of the first scenario, the second scenario is uploaded to the server for other unspecified players to access, the first scenario and the second scenario are displayed on a display of a third client computer of a player of the other unspecified players for selection, and the server receives, from the third client computer for the player of the other unspecified players, a selection of one of the first and second scenarios for game play.

13. The game system according to claim 12, wherein the first client computer plays the first scenario, and wherein the first scenario played by the first client computer, and the first scenario played by the second client computer are the same.

14. A computer implemented method for calculating a game score to create a ranking in a game executed by a processor of a computer, the method comprising:

receiving, at a host game server, a request to create a first scenario in the game using a condition of the game specified by a player operating a first client computer;

receiving, at the receiver, game play data of the first scenario from the first client computer after the player of the first client computer plays the first scenario;

determining whether the player of the first client computer achieved the one or more conditions of the first scenario;

creating, by a processor of the game server, the first scenario using the condition of the game specified by the player of the first client computer when the player of the first client computer has achieved the one or more conditions of the first scenario;

uploading the first scenario to the host game server for other unspecified players to access;

displaying the first scenario on a display of a second client computer operated by a player of the other unspecified players for selection;

receiving, at the host game server, a selection of the first scenario from the player operating the second client computer, and game play data of the first scenario in the game from the second client computer;

determining whether the game play data of the second client computer meets or exceeds the condition specified by the player of the first client computer;

when the game play data of the second client computer meets or exceeds the condition of the game specified by the player of the first client computer, creating a second scenario, different from the first scenario, using a condition of the game specified by the player of the second client computer;

uploading the second scenario to the host game server for other unspecified players to access; and displaying the first scenario and the second scenario on a display of a third client computer of a player of the other unspecified players for selection, wherein the player of the third client computer can select one of the first and second scenarios for game play.

15. The computer implemented method in accordance with claim 14, further comprising:

overwriting, by the processor of the game server, the first scenario with the second scenario.

* * * * *